N. H. FOOKS.
PROCESS OF HEAT TREATING BODIES.
APPLICATION FILED JULY 17, 1920.
1,366,778.
Patented Jan. 25, 1921.
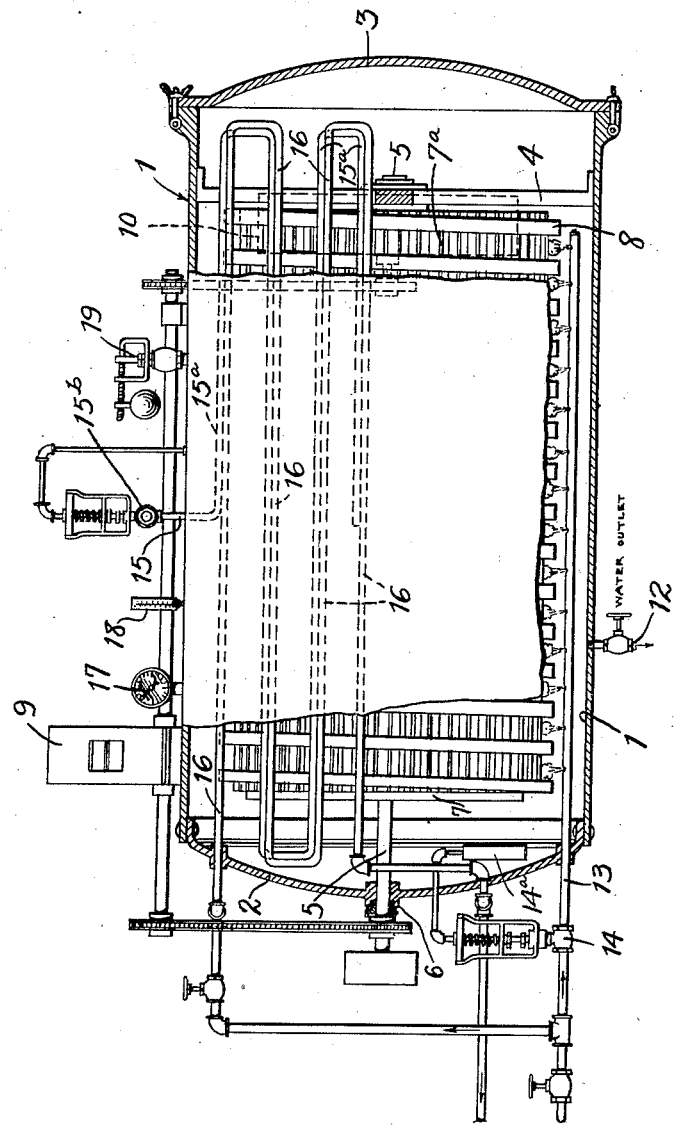
Inventor
NELSON HENRY FOOKS.
By Mason Fenwick Lawrence.
Attorneys.

UNITED STATES PATENT OFFICE.

NELSON H. FOOKS, OF PRESTON, MARYLAND.

PROCESS OF HEAT-TREATING BODIES.

1,366,778.  Specification of Letters Patent.  Patented Jan. 25, 1921.

Application filed July 17, 1920. Serial No. 396,961.

*To all whom it may concern:*

Be it known that I, NELSON HENRY FOOKS, citizen of the United States, residing at Preston, in the county of Caroline and State of Maryland, have invented certain new and useful Improvements in Processes of Heat-Treating Bodies; and I do hereby declare the following to be a full, clear, and exact description of the invention, such as will enable others skilled in the art to which it appertains to make and use the same.

In my Patent No. 1,331,337, granted February 17th, 1920, I have disclosed and claimed a continuous process of treating bodies in a liquid at relatively high temperature within a retort containing said liquid maintained under the pressure of a gas that does not liquefy under temperatures that can be practically attained, in order that said liquid may be heated far above the point at which it boils in the atmosphere surrounding the retort, without ebullition and consequent rapid evolution of vapor within the retort. Objects may be introduced into the retort, subjected to the high temperature of the liquid therein, and removed therefrom in succession without permitting the escape of any material quantity of vapor and therefore without any very considerable losses of heat and the inconvenience of befogging the room in which the retort is located. In my Patent No. 1,318,985, granted October 14th, 1919, I have disclosed and claimed an apparatus adapted to practise the aforesaid process.

My process, just referred to, is particularly useful in sterilizing and cooking such foods, sealed in cans or like containers, as require, in their treatment, a temperature above 212° F. Water and air are the most suitable and the most available liquid and gas for use in a cooking and sterilizing retort. The apparatus shown in my said patents is of a type particularly adapted for manipulating cylindrical cans, such as are very generally used for containing preserved foods. In the following discussion, therefore, steam and air will be generally referred to as examples of vapor and fixed gas, although the latter terms best emphasize the principle involved.

It is the common practice, in cooking and sterilizing such canned food products as require to be heated to a temperature higher than the boiling point of water at normal atmospheric pressure, to introduce a batch of sealed cans, containing the food products to be cooked and sterilized, into a retort and to subject the batch to the heat of steam introduced into the retort under a gage pressure of 10 pounds or more in order to attain a temperature of 240° F. or more, according to the kind of material within the cans. It has not hitherto been possible, in so far as I am aware, to continuously cook and sterilize by steam under pressures as high as are used in said batch cooking, because, in the continuous process, the losses of heat due to the escape of steam from the retort when the cans are being successively and continuously charged into the retort and discharged therefrom, are so excessive, and the inconvenience therefrom so serious, as to render continuous treatment in this manner a failure in practice hitherto, for reasons set forth herein, and more fully stated in my said Patent No. 1,331,337.

I have now discovered that objects may be successively passed through a retort or other air tight chamber containing compressed air or other fixed gas saturated with steam or other vapor, maintained at a temperature much higher than 212° F., and that the losses of steam or vapor when the objects are being introduced and removed, is much less than in prior known processes using steam alone under pressure.

In accordance with this invention, I make use of a retort or other closed vessel, having a conveyer therein adapted to move objects to be treated through the steam saturated air in the retort or other vessel, and to introduce and remove objects by means of pocketed valves or other suitable air traps. Retorts adapted for this purpose are disclosed in my said patents. Assuming the use of air and steam as most suitable for the purpose in view, I charge the vessel with compressed air at a gage pressure of, for example, 15 pounds. I also admit steam from a boiler where the gage indicates a pressure of say, 80 pounds, until a temperature of, say 240° F. is indicated by the thermometer, at which temperature water would not boil within the retort under said pressure of 15 pounds. There is then within the chamber of the retort a body of air under high pressure saturated with steam. Hence, with a comparatively small volume of steam in the space through which the objects to be heated are passed a temperature may be attained within the vessel as far above 212° F. as may be desired for the purpose in view, provided the air pressure is maintained high enough to prevent the boiling of water within the vessel at the temperature desired.

If desired, steam circulating coils may be arranged within the retort so as to help maintain the heat of the saturated air. Also, if found desirable, the incoming air may be heated before its discharge into the space within the retort by passing it through a coil lying close to the said steam heating coil. The temperature and pressure may be regulated in any desirable way, as by the manipulation of hand valves, the operator being guided by a thermometer and a pressure gage applied to the vessel; or the pressure and temperature may be regulated automatically by motor valves controlled by pressure and temperature responsive devices, respectively, in a manner that is well known. Devices for this purpose are illustrated in my Patent No. 1,331,337, hereinbefore mentioned.

The drawing illustrates, conventionally, a broken section through an apparatus adapted to practise my improved process.

In said drawing, numeral 1 indicates a retort or fluid tight vessel which may be made of boiler iron of gage suitable to withstand the pressure to be used. The head 2 is shown as secured permanently in place while the head 3 is preferably a swinging door adapted to be opened and closed so as to afford ready access to the interior of the retort or vessel. Within said retort or fluid tight vessel, adjacent the door 3, is a spider 4, which serves as a support and bearing member for the shaft 5, the other end of which passes through a bearing and stuffing box 6 in the head 2. The shaft 5 carries a rotary rack or conveyer 7 having bars $7^a$ extending parallel with the shaft 5 and spaced apart so as to receive cans, or other objects to be treated, between them. Encircling the rotary rack, and concentric therewith, is a spiral T-bar 8 adapted to form a spiral pathway along which the cans or other objects are moved by the rotary conveyer 7, the objects, during their progress around the spiral pathway, moving longitudinally of the rack and finally coming to the exit end of the vessel. The cans or other objects are charged into the retort through a rotary pocketed charging valve or air lock 9 and are finally discharged through a similar rotary discharging valve or air lock 10. The rotary rack or conveyer and the pocketed rotary valves may be operated by any suitable mechanism; as indicated in the drawing, or as shown in my Patent No. 1,318,985.

A valved outlet for water of condensation is indicated at 12. Numeral 13 indicates a steam inlet pipe, controlled by a motor valve 14, regulating the inlet of steam to be injected into the chamber within the retort.

A temperature responsive device $14^a$ controls the opening and closing movements of said valve 14. 15 indicates an air inlet pipe which is designed to be connected with a source of air under pressure, (not shown). A steam circulating coil 16 may be placed within the vessel, if desired, in order to assist in keeping the aeriform fluid within the vessel continuously at the desired temperature, and the air pipe may be continued into a coil $15^a$, the turns of which lie adjacent the turns of the steam coil 16 in order to heat the air before it enters into the space within the retort. A pressure gage 17, a thermometer 18 and a blow-off or safety valve 19 may be attached to the vessel, as shown, and a motor valve $15^b$ may control the admission of air through pipe 15 in response to the pressure within the vessel.

By maintaining air under a pressure within the retort sufficient to enable the required temperature to be attained when steam is used within the chamber as a heating fluid, and by admitting steam, either under the control of the operator or under the control of a temperature responsive device in sufficient quantity to keep a given temperature below the point at which water would boil under said air pressure, only enough steam is required to keep the air saturated. Then, in the normal operation, objects may be charged into the retort at one end, carried through the heated aeriform fluid and discharged at the other end without excessive losses of steam, and therefore of heat; and it will be possible by this process to keep up the desired temperature, because a large proportion of the fluid that wastes into the air outside of the retort as the objects are inserted and removed, is atmospheric air. Also, there will not be sufficient steam under high pressure escaping from the pockets of the rotary valves or air locks to fog the atmosphere of the factory to such an extent as to seriously hinder the workers.

Although the losses by escape of steam or other vapor by this process may be greater than in the process disclosed in my said prior patents, yet I secure, by it, certain advantages in operation; Apparatus of the kind described sometimes cease functioning, as by the clogging of an object within the retort. When this occurs it is necessary to stop the operation, gain access to the retort and clear out the obstruction. When hot water is used as a heating medium the water must be drawn off, the retort allowed to cool, then opened, the obstruction removed, the retort closed, and again filled with water. This water must then be heated to a temperature sufficient for the purpose in view. These operations consume considerable time, and clogging of the machine, it will be apparent, may cause the loss of an hour or so.

In my present process, should the conveyer become clogged, it is only necessary to blow off the steam and air within the retort, open the retort, remove the obstruction and again admit steam and air; an operation that can be performed very quickly.

Having described my invention in such manner as to enable those skilled in the art to practise the same, what I claim and desire to secure by Letters Patent is:

1. The process of heat treating bodies in a retort or similar fluid-tight vessel, which consists in maintaining a body of fixed gas in the vessel, under pressure, and saturated with vapor; maintaining a desired temperature within the vessel that is higher than that of the normal boiling point of the liquid from which said vapor was evolved, in the atmosphere surrounding the vessel, but which temperature is lower than that at which said liquid would boil under the gas pressure existing within said vessel; and, while maintaining said pressure and temperature, successively introducing the bodies to be treated into the vessel, subjecting them to the heat of the aeriform fluids therein, and successively removing them from the vessel.

2. The process of heat treating bodies in a retort or similar fluid-tight vessel, which consists in maintaining a body of air in the vessel, under pressure, and saturated with steam; maintaining a desired temperature within the vessel that is higher than that of the normal boiling point of water in the atmosphere surrounding the vessel, but which temperature is lower than that at which water would boil under the air pressure existing within said vessel; and, while maintaining said pressure and temperature, successively introducing the bodies to be treated into the vessel, subjecting them to the heat of the aeriform fluids therein, and successively removing them from the vessel.

3. The process of heat treating bodies in a retort or similar fluid-tight vessel, which consists in maintaining a body of fixed gas in the vessel, under pressure, and saturated with vapor; maintaining a desired temperature within the vessel that is higher than that of the normal boiling point of the liquid from which said vapor was evolved, in the atmosphere surrounding the vessel, but which temperature is lower than that at which said liquid would boil under the gas pressure existing within said vessel; successively introducing the bodies to be treated into the vessel, subjecting them to the heat of the aeriform fluids therein, and successively removing them from the vessel, and replacing the lost gas and vapor escaping with the introduction and removal of the objects with equal volumes of said gas and vapor in order to maintain the desired heat and pressure within the vessel.

4. The process of heat treating bodies in a retort or similar fluid-tight vessel, which consists in maintaining a body of air in the vessel, under pressure, and intimately mixed with steam; maintaining a desired temperature within the vessel that is higher than that of the normal boiling point of water in the atmosphere surrounding the vessel, but which temperature is lower than that at which water would boil under the air pressure existing within said vessel; successively introducing the bodies to be treated into the vessel, subjecting them to the heat of the aeriform fluids therein, and successively removing them from the vessel, while maintaining the required pressure and heat by replacing the lost air and steam, escaping from the vessel with the introduction and removal of the bodies, with additional air and steam.

In testimony whereof I affix my signature.

NELSON H. FOOKS.